US009767134B2

(12) United States Patent
Anderson et al.

(10) Patent No.: US 9,767,134 B2
(45) Date of Patent: Sep. 19, 2017

(54) DISTRIBUTED CMDB INFORMATION WITHIN A SERVICE MANAGEMENT TICKETING SYSTEM

(71) Applicant: INTERNATIONAL BUSINESS MACHINES CORPORATION, Armonk, NY (US)

(72) Inventors: Eric M. Anderson, Friendswood, TX (US); Robert A. Davis, Atlanta, GA (US); Christopher J. Dawson, Arlington, VA (US); Rajesh Radhakrishnan, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 14/242,611

(22) Filed: Apr. 1, 2014

(65) Prior Publication Data
US 2015/0278279 A1 Oct. 1, 2015

(51) Int. Cl.
*G06F 17/30* (2006.01)
*H04L 12/24* (2006.01)

(52) U.S. Cl.
CPC .... *G06F 17/30345* (2013.01); *H04L 41/0813* (2013.01); *H04L 41/28* (2013.01); *G06F 17/30365* (2013.01)

(58) Field of Classification Search
CPC ............ G06F 17/30345; G06F 17/30365
USPC ........................ 707/609, 636, 802
See application file for complete search history.

(56) References Cited

U.S. PATENT DOCUMENTS 8,082,222 B2 12/2011 Rangarajan et al.
8,983,982 B2* 3/2015 Rangarajan ....... G06F 17/30607
707/756
2009/0319559 A1* 12/2009 Westerfeld ............ G06Q 10/10
(Continued)

FOREIGN PATENT DOCUMENTS

EP 2182448 A1 5/2010

OTHER PUBLICATIONS

G. Hilson, "HP Brings Just-In-Time Discovery to Cloud Computing", networkcomputing.com, UBM Tech, Jul. 24, 2012, pp. 1-3.
(Continued)

*Primary Examiner* — Marc Filipczyk
(74) *Attorney, Agent, or Firm* — John R. Pivnichny; Law Office of Jim Boice (57) ABSTRACT

A method and/or computer program product locally manages configuration item (CI) information on CI systems. A request is received for authorized CI information that describes an authorized change to be made to a particular CI system. In response to receiving the request for the authorized CI information, a ticketing system searches a Configuration Management Database (CMDB) stub database for a location of a CI to be changed according to the authorized change to the particular CI system, where the CMDB stub database contains no CIs, and where the CMDB stub database contains a location of CI systems in which CIs are locally stored. One or more processors initiates the authorized change to the particular CI system requested by the request, and updates, by the particular CI system, the CI in the particular CI system to reflect the authorized change to the particular CI system.

14 Claims, 3 Drawing Sheets

(56) References Cited

U.S. PATENT DOCUMENTS

| | | | |
|---|---|---|---|
| 2010/0115100 A1* | 5/2010 | Tubman | G06F 17/30545 709/227 |
| 2010/0185658 A1 | 7/2010 | Kowalski | |
| 2013/0311465 A1* | 11/2013 | Muramoto | G06F 17/30392 707/736 |
| 2013/0326036 A1 | 12/2013 | Heumesser et al. | |

OTHER PUBLICATIONS

C. Casanova et al., "What is a CMDB?" Pearson Education, INFORMIT, Apr. 23, 2009, pp. 1-16.

* cited by examiner

DISTRIBUTED CMDB INFORMATION WITHIN A SERVICE MANAGEMENT TICKETING SYSTEM

BACKGROUND

The present disclosure relates to the field of computers, and specifically to the use of computers in managing resources. Still more particularly, the present disclosure relates to discovering and managing configuration item information for resources.

A Configuration Management Database (CMDB) is a unified repository of information. An exemplary CMDB stores data that describes resources in an Information System (IS). Included in the CMDB are documents called Configuration Items (CIs). A CI is a document that provides a description of one or more resources within the IS, including hardware resources (e.g., storage devices, servers, routers, etc.) as well as software resources (applications, databases, etc.).

SUMMARY

In one embodiment of the present invention, a method and/or computer program product manages configuration item (CI) information by storing said information directly on CI systems. A request is received for authorized CI information that describes an authorized change to be made to a particular CI system. In response to receiving the request for the authorized CI information, a ticketing system searches a Configuration Management Database (CMDB) stub database for a location of a CI to be changed according to the authorized change to the particular CI system, where the CMDB stub database contains no CIs, and where the CMDB stub database contains a location of CI systems in which CIs are locally stored. One or more processors initiates the authorized change to the particular CI system requested by the request, and updates, by the particular CI system, the CI in the particular CI system to reflect the authorized change to the particular CI system.

In one embodiment of the present invention, a system for locally managing configuration item (CI) information on CI systems comprises: a CI system, wherein the CI system is a hardware resource that locally stores a CI that describes resources within the CI system; a ticketing system, wherein the ticketing system is a hardware system that receives a request for authorized CI information, wherein authorized CI information describes an authorized change to be made to the CI system; a Configuration Management Database (CMDB) stub database server, wherein the CMDB stub database server contains a CMDB stub database, wherein the CMDB stub database contains a location of CI systems in which CIs are locally stored, and wherein the CMDB stub database server, in response to the ticketing system receiving the request for the authorized CI information, provides a location of a CI to be changed according to the authorized change to the CI system; and a managing server, wherein the managing server: supervises updates to CIs in the CI systems; generates a cross CI report, wherein the cross CI report identifies all CIs that describes a predefined descriptor of the CI system; initiates the authorized change to the CI system requested by the request; and updates the CI in the CI system to reflect the authorized change to the CI system.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
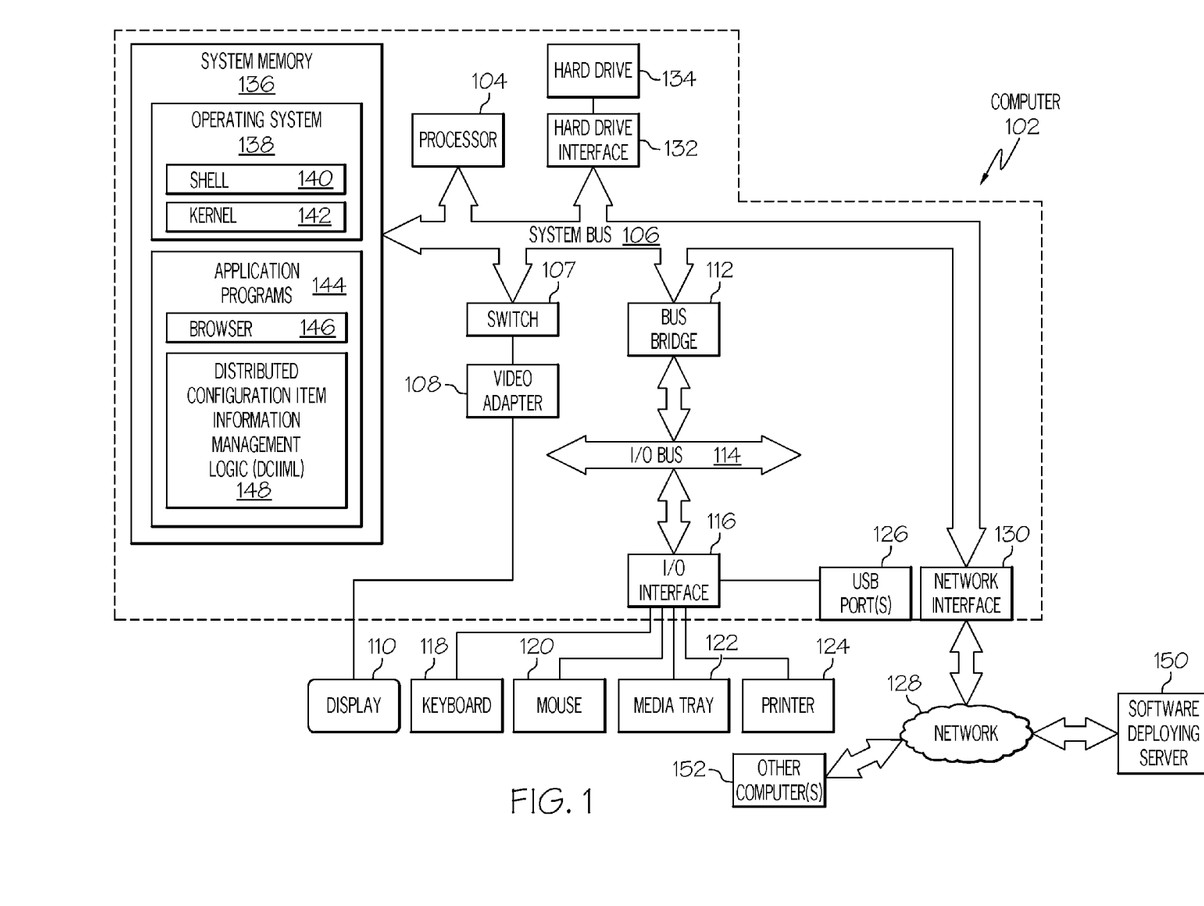
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152, as well as the ticketing system 1, parser system 3, non-CI system(s) 13, proxy CI system 14, database server 21, and/or managing server 22 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Distributed Configuration Item Information Management Logic (DCIIML) 148. DCIIML 148 includes code for implementing the processes described below, including those described in FIGS. 2-3. In one embodiment, computer 102 is able to download DCIIML 148 from software deploying server 150, including in an on-demand basis, wherein the code in DCIIML 148 is not downloaded until needed for execution. Note further that, in one embodiment of the present invention, software deploying server 150 performs all of the functions associated with the present invention (including execution of DCIIML 148), thus freeing computer 102 from having to use its own internal computing resources to execute DCIIML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
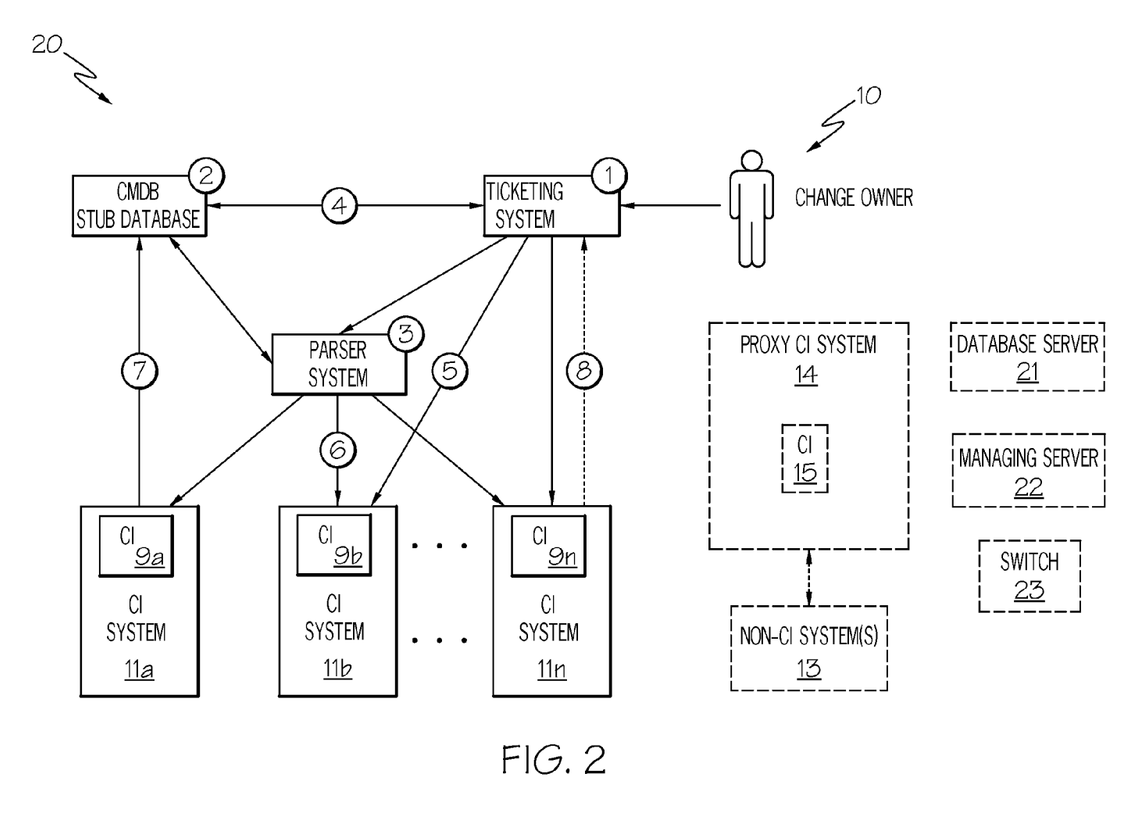
FIG. 2 illustrates detail of a system for locally managing Configuration Item (CI) details on CI systems, apart from a Configuration Management Database (CMDB)

With reference now to FIG. 2, a diagram of a system 20 shows an arrangement of a ticketing system 1, a Configuration Management Database (CMDB) stub database 2, a parser system 3, a set of Configuration Item (CI) systems 11a-11n described by Configuration Items (CIs) 9a-9n, and a non-CI system 13 described by a CI 15.

In one embodiment, the ticketing system 1 is a component of computer 102 depicted in FIG. 1, while the CMDB stub database 2, parser system 3, CI systems 11a-11n, and/or a computer system used by Change Owner 10 are implemented as other computer(s) 152 depicted in FIG. 1. In other embodiments, one or more of the CMDB stub database 2, parser system 3, CI systems 11a-11n, and/or computer system used by Change Owner 10 use computer 102 while the ticketing system 1 uses one of the other computer(s) 152 depicted in FIG. 1.

Configuration Items (CIs) 9a-9n (where "n" is an integer) represent one or more configuration items within system 20. A CI is defined as a document that provides a description of one or more resources (such as CI systems 11a-11n in FIG. 2) within an Information System (IS), such as system 20 shown in FIG. 2. The resources (e.g., CI systems 11a-11n) described by the CIs 9a-9b includes hardware resources (e.g., storage devices, servers, routers, etc.) as well as software resources (applications, databases, etc.).

Ticketing system 1 is a service management ticketing system for managing tickets (Incidents, Problems, Service Requests) as well as Changes. That is, ticketing system 1 is part of a service management system that provides a service for managing resources, such as CI systems 11a-11n. For example, if an incident/problem/service request is raised for one or more of the resources (i.e., CI systems 11a-11n and/or non-CI system(s) 13, respectively described by CIs 9a-9n and CI 15), or if a change is to be implemented in one or more of the resources described by CIs 9a-9b, then a ticket is generated for that resource by ticketing system 1, to handle the incident/problem/service request and/or to institute the change being requested.

CMDB stub database 2 is a system that contains information needed to locate and communicate with one or more of the CIs 9a-9n. Note that CMDB stub database 2 is not a CMDB, which holds complete versions of Configuration Items (CIs), as well as descriptive relationships among CIs. That is, a complete CMDB stores information that fully describes the features, properties, capabilities, settings, etc. of CIs. In accordance with the present invention, this information is not stored in the CMDB stub database 2. Rather, the CMDB stub database 2 (as the name implies) is merely a database that contains abbreviated information (hence the term "stub" used in the name "CMDB stub database 2") needed to communicate directly with the CIs 9a-9n. More specifically, the CMDB stub database 2 contains a list of the CIs 9a-9b, their Unique IDentifiers (UIDs), and their locations/addresses (e.g., an IP address of the CI system 11a-11n in which the CI is stored), thus providing to the ticketing system 1 and parser system 3 the ability to communicate directly with the CI systems 9a-9n.

Parser system 3 is a system that is used to break a high level query into smaller work items that may be dispatched to a relevant set of CIs from CIs 9a-9n. For example, a Change Owner 10 may request 'tell me all Linux servers that have 3 Gb of memory'. In this example, the request may be sent to parser system 3, which first looks at the CMDB stub database 2 to determine all Linux servers and their locations. Next, the parser system 3 looks to determine if any of this report query is cached (a call to the Linux server may not be needed). Finally, a list of Linux servers that need to be queried is generated. The parser system 3 then breaks out each request and send out to each Linux server a request for memory size. The parser system 3 waits for all results to be received before compiling/generating a final report. In another example, a high level query may be "What systems are running on the computer represented by CI 9a?" Parser system 3 will break this query down into 1) "What type of processor is running on the computer represented by CI 9a?"; 2) "What type/size memory is within the computer represented by CI 9a?"; 3) "What operating system is running on the computer represented by CI 9a?"; etc., and then submit these sub-queries to the CI 9a.

Communication system 4 allows ticketing system 1 to query the CMDB stub database 2 to associate one or more of the CIs 9a-9b with a particular ticket or change.

Communication system 5 allows ticketing system 1 to communicate with a particular CI system (from CI systems 11a-11n) to gain actual and authorized information to be either populated in the ticket/change or displayed to the Change Owner 10 (e.g., via a display on a computer such as computer 102 depicted in FIG. 1 and used by the Change Owner 10). "Actual" information is defined as information that describes a current state of a system, including CI systems (11a-11n) as well as non-CI system(s) (13). "Authorized" information is defined as information that describes software, hardware and other attributes that a particular system, CI or non-CI, is licensed or otherwise authorized to have, but which may or may not be installed on that particular system. More specifically, "authorized CI information" describes an authorized change that is to be made to a particular CI system.

Note that the Change Owner 10 may be a person (e.g., an Information Technology—IT manager), or a supervisory computer system that is devoted to managing resources such as CI systems 11*a*-11*n*. Note that CI systems 11*a*-11*n* are all hardware systems in one embodiment; CI systems 11*a*-11*n* are all software systems in one embodiment; and CI systems 11*a*-11*n* are a combination of hardware and software systems in another embodiment.

Communication system 6 is a communication system that allows the parser system 3 to communicate with one or more of the CI systems 11*a*-11*n* to gain actual and authorized information to be either populated in the ticket/change or displayed to the Change Owner 10.

Communication system 7 is a communication system that provides a channel for a particular CI from CIs 9*a*-9*n* to register or update information to the CMDB stub database 2.

Escalation communication system 8 is a communication system that allows variance issues or other concerns to be automatically raised as Incidents. That is, if a CI such as CI 9*n* is updated to show that a processor within CI system 11*n* is overheating, then an Incident message is sent to the ticketing system 1, where a ticket will be generated to handle this Incident.

As described herein, the present invention eliminates the need for a complex discovery/centralized CMDB by managing CI attribute information either directly on the computer systems that the CI represents (for example, a Linux system) or by a proxy system (in the case of systems that cannot themselves store CI information). To achieve this, each computer system (e.g., one or more of the CI systems 11*a*-11*n* depicted in FIG. 2) in an environment (e.g., system 20) may host one or more CIs—containing both actual and authorized attributes. For example, a Linux computer system may contain all details of that Linux system—both discovered (actual) and updated based on a change request (authorized). This computer system responds to requests for data and has the ability to update both actual and authorized CI information.

In order for the ticketing system 1 (which in one embodiment is a Change Management system that manages updates/changes to one or more of the CI systems 11*a*-11*n*) to be able to connect to a computer system to query a CI from CIs 9*a*-9*n*, an Enterprise System Management (ESM) system such as CMDB stub database 2 is used. CMDB stub database 2 contains a base set of CI information that includes no attributes other than a UID and location information (e.g., an Internet Protocol (IP) address) for a particular CI system, and thus the CI stored therein. This stub database can be used to determine the location of the CI or CI-proxy system that holds the CI, such that queries for more CI information can be made to the CIs.

The stub database may be as simple as a list of CI UIDs:
UID CI name Description Location information Proxy? Business Application
1 Linux Server1 Linux server 192.168.1.234 N Credit Card Processing
2 Windows Server2 Windows server 192.168.2.3 N Financial App
3 Switch1 Model Z Switch 192.168.1.234 Y NA
4 Firewall2 Firewall 192.168.1.234 Y NA . . . .

In the example above, the Linux and Windows servers store CI information themselves—and therefore the stub database contains the IP address of these servers with the 'proxy' field set to 'no'—meaning that the CI is not hosted on a proxy.

In one embodiment, additional fields are stored at the stub level—in this example 'Business Application'—for those attributes that may be frequently used—to prevent a broadcast of data requests such as 'tell me all CIs that have something to do with the credit card processing application'.

Note that CI systems 11*a*-11*n* are identified as "CI" systems since they 1) locally store their respective CIs (9*a*-9*n*), and 2) have the processing power to change/manage/manipulate their respective CIs. However, certain systems, such as a network switch or a firewall do not have the ability to store and/or manage their own CI information. These systems (depicted in FIG. 2 as non-CI system(s) 13) thus use a proxy CI system 14, which contains a CI 15 that describes the attributes of one or more of the non-CI system(s) 13. Proxy CI system 14 is then able to communicate with ticketing system 1, CMDB stub database 2, and/or parser system 3 in a same manner as described above for CI systems 11*a*-11*n*. For example, assume that proxy CI system 14 is a Linux server with the 'proxy' field set to 'yes'. In this example, when information is requested about the switch (e.g. one or the non-CI system(s) 13), the request is not made to the switch directly, but to the Linux server (proxy CI system 14) that responds on behalf of that switch.

In one embodiment, another mechanism to register CI information is through the use of an Enterprise Service Bus (ESB) using a publish/subscribe (Pub/Sub) mechanism. An ESB is a software architecture model that allows software applications to interact (e.g., communicate with one another in a coordinated manner) in a Service-Oriented Architecture (SOA). A Pub/Sub mechanism is a system in which a publisher (a sender of messages about CI and non-CI systems) sends such messages to subscribers, who have subscribed to receive messages for a particular class of messages (i.e., messages about certain CI systems and/or non-CI systems). In this embodiment, a series of ESBs associated with one or more networks may be used. Servers, Networks, Switches, etc. all connect to their nearest ESB to wait for requests for information.

Each system (e.g. a CI system from CI systems 11*a*-11*n* or a proxy CI system such as proxy CI system 14) that is able to store CI information contains a set of data with CI attributes. These attributes are tagged as 'actual', 'authorized' or 'both' as shown in the following example:
UID: Linux Server1
Attribute Type Value
Memory Both 2 Gb
CPU Actual 2 Ghz
Software Auth Program X License Auth Program X . . . .

In this example, the UID for Linux Server 1 contains a set of attributes that are shown as actual, authorized, or both. That is, the CI contains authorized information describing Linux Server1 as being authorized to run 'Program X' (e.g., a word processing program) and the corresponding license for 'Program X'. The CI also includes actual information about Linux Server1 showing that this server has a 2 Gb memory (i.e., system RAM) with a 2 Ghz CPU. The list of attributes may be small or large depending on how much information is necessary to be collected. Again, however, note that this information is not stored within the CMDB stub database 2 shown in FIG. 2. Rather, this information is limited to the CI (e.g., one of CIs 9*a*-9*n* or CI 15 shown in FIG. 2).

In one embodiment, a CI system updates its own actual CI information—perhaps on a periodic scan of the system. Any variances are automatically ticketed as Incidents. For example, CI system 11*a* updates CI 9*a* of its own volition. If an update shows a problem or inconsistency with what the CI 9*a* previously stored (thus indicating a change to CI system 11a that was not updated in the CI 9a), then an Incident report is sent to the ticketing system 1.

Consider now an example to request CI attribute information. A change request from a Change Owner 10 is generated to increase the amount of memory of Linux Server 1 (e.g., CI system 11a). The change request is generated by the ticketing system 1, and the CMDB stub database 2 is searched for the Linux Server 1 CI (i.e., CI 9a). The location information is found within the CMDB stub database 2, and a call is made by the ticketing system 1 (in one embodiment, via the parser system 3) to the CI 9a in CI system 11a (i.e., Linux server 1, located at IP address 192.168.1.234) to request more information about the current amount of memory in Linux server 1. A simple request (e.g., using a Secure SHell—SSH cryptographic system, a Remote Procedure Call—RPC system, etc.) is used to communicate to a daemon (i.e., a process running in the background on the Linux Server 1) to request the information. The value 2 Gb is sent back to the ticketing system 1 and displayed to the Change Owner 10. In one embodiment, this information is returned in real time, while in another embodiment it is returned ad-hoc when requested by the person accessing the change ticket.

Now the change to Linux Server 1 is implemented and the memory is increased. Before the change ticket is closed, a request is made back to Linux server 1 to update the authorized CI information (i.e., information describing what changes are authorized) to change the amount of memory from 2 Gb to 3 Gb. Again, a simple call is made and the update is made. Linux Server 1 also scans itself and automatically updates the actual CI information (information describing the current status of Linux Server 1) to confirm that the amount of memory is now 3 Gb. If there is a variance, again, an Incident can automatically be generated. Again, note that the CI 9a stores authorized information (describing changes that are authorized to be made) as well as actual information (describing the resources that actually exist within a system).

In one embodiment, a description of the new amount of memory on the Linux server 1 may be cached at the CMDB stub database 2 and/or to the ticketing system 1 for a period of time to prevent multiple requests to the CI 9a. However, note that this cached information is 1) only for a limited period of time, after which it is automatically deleted, and 2) does not include all of the information in the CI 9a, and thus is not a complete CMDB record for CI system 11a.

In one embodiment, relationships between CIs are managed in a distributed nature. For example, a request may be made to the Linux server 1 to determine dependencies—for example, it may know it depends on a database server such as database server 21 shown in FIG. 2. For each dependency, it updates a hop count (Linux server at CI system 11a=hop count 1, DB2 in database server 21=hop count 2). A request can then be made to the computer system managing database server 21 to ask for more details and exactly what it is also dependent on. If database server 21 is dependent on, say a switch, the switch hop count is updated to '3' and the process is repeated until, for example, the hop count reaches a pre-defined number. In this example, dependencies may automatically be built up in real time—similar to a 'breadth first search' algorithm.

Variances and reporting may be scheduled or ad-hoc. In the case of variance, a request may be periodically made to all CI systems to perform a variance. In another embodiment, a daemon on each CI computer system may be configured to automatically run variance scans (e.g., every 24 hours). In either case, the system analyzes any changes on the system and compares to current actual and authorized information. If there is a discrepancy, an Incident may be generated.

A report, however may span more than one CI—indeed may need to query many CIs. In this case, the parser system 3 may be used to break down a request into smaller pieces of work that may be dispatched to each CI server. Consider the example of a report 'tell me all Linux servers that have 3 Gb of memory'—in this case, the request may be sent to a parser system that first looks at the stub database to determine all Linux servers and their locations. Next, it looks to determine if any of this report query is cached (a call to the Linux server may not be needed). Finally, a list of Linux servers that need to be queried is generated. The parser then breaks out each request and send out to each Linux server a request for memory size. The parser waits for all results to be received before compiling a final report.

In one embodiment, the system described herein may be used to perform more complex types of analysis, including a Root Cause Analysis (RCA) type of analysis. Because queries can be made directly to computer systems, rather than just querying CI attribute information, detailed information such as log files or other error databases from the computer systems can be used to determine issues and problems. In this example, the present system is used to perform ad-hoc queries such as 'tell me whether any Linux servers have 'out of memory' in their log files'.

Note that in one embodiment, one or more or the processes described herein are under the control of a managing server 22. That is, managing server 22 can regulate which messages are sent from the Change Owner 10 to the ticketing system 1, how proxy CI system 14 is identified and/or located, etc.

Note that in one embodiment, a switch 23 is used to couple certain components (e.g., database server 21) to ticketing system 1, CMDB stub database 2, and/or CI systems 11a-11n.

Figure 3:
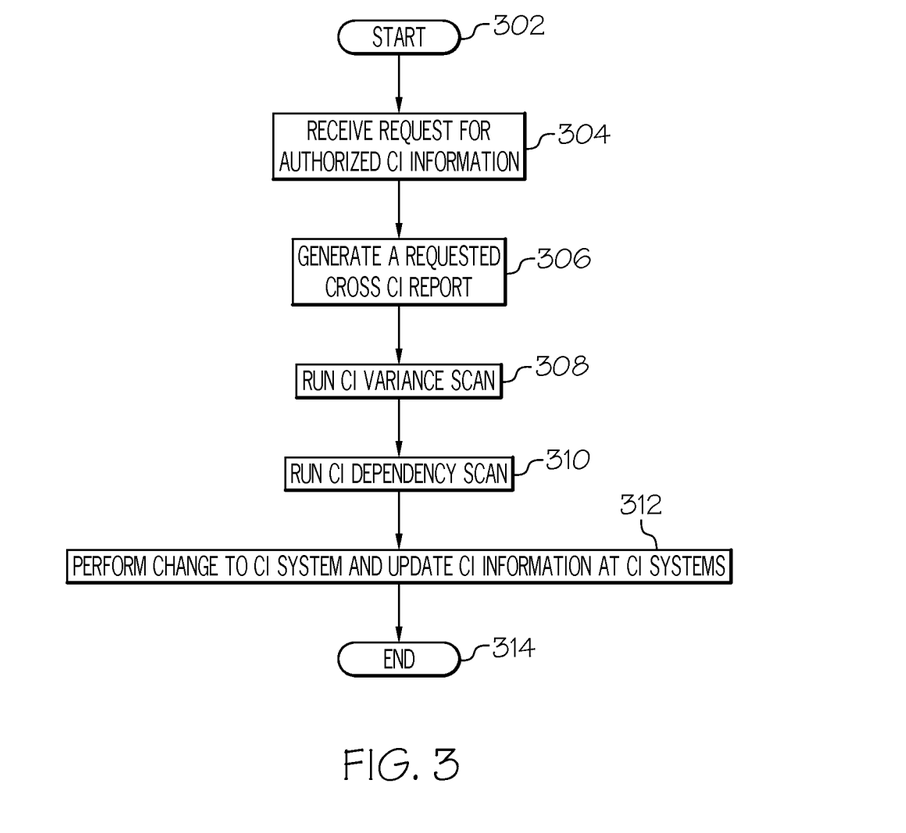
FIG. 3 is a high level flow-chart of one or more operations performed by one or more processors to locally manage CI details on CI systems.

With reference now to FIG. 3, a high level flow-chart of one or more operations performed by one or more processors to locally manage CI details on CI systems, apart from a CMDB, is presented.

After initiator block 302, a request for authorized CI information is received (block 304) by a ticketing system 1 and/or a managing server 22 from the Change Owner 10 shown in FIG. 2. This authorized CI information describes an authorized change to be made to a particular CI system (or non-CI system if a proxy CI system is used). For example, the ticketing system 1 in FIG. 2 may receive from Change Owner 10 a request to change the configuration of CI system 11a. The Change Owner 10 fills out information (e.g., on a website, an on-line form, etc.), which populates a certain CI field. Clicking on this CI field causes the ticketing system 1 to communicate with the CMDB stub database 2 to search for a location of CI system 11a, which is being requested to change according to the received request. In one embodiment, the Change Owner 10 and/or ticketing system 1 filters on CIs that are related to the type of 'computer system' and OS used thereon (e.g., Linux). A set of UIDs for the CI systems 11a-11n and their respective CIs 9a-9n are displayed to the Change Owner 10 (e.g., via the display 110 in the computer 102 shown in FIG. 1). Assuming that the Change Owner 10 can determine which CI to choose from this information, he selects the appropriate CI (e.g., CI 9a), and populates a change ticket in the ticketing system 1 with the identification/location of CI 9a. If the Change Owner 10 cannot determine which CI to choose, the parser system 3 is used to query all Linux CI systems within system 20 for attribute information. This attribute information is then pulled back to the CMDB stub database 2. The Change Owner 10 now has access to all CI attribute information and may select one or more CIs from CIs 9a-9n.

As described in block 306, the ticketing system 1 and/or another management computer (e.g., management computer 22 shown in FIG. 2), receives a request for a cross CI report, and then generates that requested cross CI report. For example, assume that the Change Owner 10 determines that a report is needed for all Linux systems that have over 3 Gb memory. The Change Owner 10 then opens a reporting application in the ticketing system 1 (e.g., via a network connection) and creates the query. The parser system 3 is then used to communicate to the CMDB stub database 2 to determine the set of CIs that need to be queried (e.g. all CIs that describe Linux systems where the amount of memory attribute is not cached locally by the Change Owner 10). The parser system 3 breaks down the requests to each CI and sends out the requests and waits for the results. The parser system 3 then combines the results of each of the queries (to each of the CIs 9a-9n), and determines which CIs have more than 3 Gb memory. This information is then passed back to the ticketing system 1 to be stored and/or displayed to the Change Owner 10.

As described in block 308, one or more of the CI systems 11a-11n run a CI variance scan. A CI variance scan is either scheduled to be run or is ad-hoc—requested by a user such as Change Owner 10. Each of the CI systems 11a-11n have a scheduler (assuming that CI systems 11a-11n are computer systems) that is set to run a variance—perhaps every 24 hours. If the CI variance scan is an ad-hoc scan, the query is made to the CI system to run the variance. Each of the CI systems 11a-11n runs a local scan to determine any variances between newly discovered CI attribute information and the current list of actual CI information found in their respective CIs 9a-9n. If a variance is found, a communication may be sent back to the ticketing system 1 to generate an Incident automatically. The CI computer system from CI systems 11a-11n that the Change Owner 10 has queried, then performs a variance analysis between actual and authorized CI information to determine any differences. Note that in one embodiment, the ticketing system 1 and/or managing server 22 run the CI variance scan, particularly if the CI system is a non-CI system (e.g., one of the non-CI system(s) 13 shown in FIG. 2). In another embodiment, however, the CI variance scan is run on the CI system (e.g., one or more of CI systems 11a-11n).

As described in block 310, the ticketing system 1 and/or managing server 22 run a CI Dependency Scan. A dependency scan is either scheduled to be run or is ad-hoc—requested by a user such as Change Owner 10. A request may be made to the Linux server (e.g., CI system 11a) to determine dependencies—for example, it may know it depends on a database server. For each dependency, it updates a hop count (Linux server=hop count 1, DB2=hop count 2). A request can then be made to the computer system (e.g., managing server 22) managing the database server (e.g., database server 21) to ask for more details and exactly what it is also dependent on. For example, if the database server 21 is dependent on a switch (e.g., switch 23 shown in FIG. 3), the switch hop count is updated to '3'. The process is repeated until, for example, the hop count reaches a pre-defined number. In this example, dependencies may automatically be built up in real time.

As described in block 312, the changes requested by the Change Owner 10 to the CI system are made, and that system's local CI is then updated. That is, CIs 9a-9n (in the case of a CI system) and/or CI 15 (in the case of a non-CI system) are updated within their respective CI systems 11a-11n or proxy CI system 14 shown in FIG. 2 after the authorized/requested change(s) to CI systems 11a-11n or proxy CI system 14 are made. Again, note that these updated CIs are not part of CMDB stub database 2, which only contains information for locating the CI/non-CI systems. The method ends at terminator block 314.

As described herein, the present invention presents a system and method to improve Configuration Management (and more specifically management of Configuration Items) through just in time CI attribute discovery. The present invention solves the problem of having to have a very large complex centralized CMDB with a scheduled set of 'discovery' systems. It also solves the problem of having to rely on a set of data only current since the last discovery scan was made.

That is, in the prior art, attaching Configuration Item (CI) information to ticketing and change systems such as Incidents, Problems and Changes is an industry best practice, but to do that, there must be a complex central CMDB that contains all possible CIs that can be chosen. This CMDB is usually in the form of a large database that stores many, many CIs centrally. This CMDB is usually co-located with the ticketing and Change Management system that requires a link to one or more CIs.

The issue with the prior art is that central CMDBs are very large and hard to maintain. Managing a very large database is a non-trivial task. For the CMDB to be accurate, a set of complex discovery systems must be installed across the IT infrastructure to capture CI information to be fed into the CMDB. This discovery information is also complex and causes a large amount of data to be sent over the network. A fully populated CMDB is only as accurate as the last scan that was performed which therefore requires frequent scans for it to be usable.

The pre-defined schema associated with the CMDB also restricts what information each of the CIs contain. For example, a discovery system may discover 100 attributes associated with a CI including hostname, IP addresses and memory size. This will lead to a CMDB that is so large, a specific configuration parameter may not be readily available. Furthermore, of all of the information stored in the CMDB, a very small amount is ever actually used, leading again to a very inefficient system.

This present invention solves the problems above by eliminating the need for an expensive centralized CMDB and discovery systems through the use of 'just in time' CI retrieval and discovery. The invention describes a mechanism whereby both actual and authorized CI information can be requested in real time directly from the computer systems they represent. For example, requesting CI information associated with a Linux server will cause a connection to that Linux server to pull the information. This results in retrieval of only the information that is used and ensures that the data is accurate and up to date.

The present invention also improves scalability. With a prior art central CMDB and discovery system, there is always a limit (bandwidth, disk space, length of scan, etc.,) to the amount of data that can be stored in a CMDB. Combined with every increasing processing power needed to perform reporting (variances, CI promotion, etc.,), such prior art systems are not scalable to large scale systems without immense networking and processing power. The present invention solves the problem in that reports and scans can be performed in a distributed fashion—on the device/server that the CI represents—such that all systems in an IT infrastructure may run their own piece of a report and a central server then only used to consolidate report fragments together.

This distributed system also allows the ability to drastically improve the time taken to perform distributed reporting and variances—by breaking down a report request (such as how many Linux servers do I have that have 2 Gb memory?) and sending the request to multiple systems for processing. In a similar fashion, this idea can be used to perform complex Root Cause Analysis (RCA) work by sending out targeted requests to computer systems such as 'tell me if the debug log file contains the error code xxx'.

Thus, the present invention presents various points of novelty over the prior art, including, but not limited to:

A distributed CMDB where both actual and authorized Configuration Item (CI) information is stored;

A mechanism to utilize a proxy for those CIs which do not represent a computing system (for example, a CI representing a network switch that may not be able to store CI information may actually be maintained by a different system—perhaps a Linux server);

A mechanism for new computer systems to register to the ESB or central CMDB stub database with the ability to cache recent CI queries;

A system and method to manage both actual and authorized CI modifications—such that authorized CIs are updated based on a change request being successfully completed;

A system that supports a central CMDB stub database—which contains pointers to the systems that contain the detailed CI attributes;

A mechanism to allow scheduled variances, promotions and reports to be generated in a distributed fashion;

A parser system (for pre and post processing) to break a high level request across multiple CIs to smaller pieces of work that are farmed out to each computer system managing a set of CIs;

A distributed mechanism to manage CI relationships by direct query of the CI; and/or An improved mechanism to perform Root Cause Analysis through the ability to query CI systems for specific CI attribute information or other information (such as log entries).

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method to locally manage configuration item (CI) information on CI systems, the method comprising:
receiving, by one or more processors, a request for authorized CI information, wherein authorized CI information describes an authorized change to be made to a particular CI system;
in response to receiving the request for the authorized CI information, searching, by a ticketing system, a Configuration Management Database (CMDB) stub database for a location of a CI to be changed according to the authorized change to the particular CI system, wherein the CI is a document that provides a description of the particular CI system, wherein the CMDB stub database contains no CIs, wherein the CMDB stub database contains a location of CI systems in which CIs are locally stored, wherein the CI systems in which the CIs are locally stored are configured according to the CIs that are stored within the CI systems, and wherein the ticketing system is a hardware system;
initiating, by one or more processors in the particular CI system, the authorized change to the particular CI system requested by the request;
updating, by one or more processors, the CI in the particular CI system to reflect the authorized change to the particular CI system;
parsing, by a parser system, the request into multiple sub-requests, wherein each of the multiple sub-requests is a query for a description of a same component found in each of multiple CI systems;
determining, by the parser system, whether an answer to one or more of the multiple sub-requests is stored in a cache in the CMDB stub database;
in response to determining that the answer to the one or more of the multiple sub-requests is not stored in the cache, associating, by the parser system, each of the multiple CI systems with a particular CI;
transmitting, by the parser system, each of the multiple sub-requests to the particular CI in a corresponding CI system from the multiple CI systems;
receiving, by the parser system, responses to all of the multiple sub-requests;
generating, by the parser system, a final report based on the responses to all of the multiple sub-systems, wherein the final report comprises a description of a size of memory in each of the multiple CI systems;
running, by one or more processors, a CI variance scan, wherein the CI variance scan scans CIs in the CI systems to determine if any variances to the CIs have occurred since a last CI variance scan; and
running, by one or more processors, a CI dependency scan, wherein the CI dependency scan determines a hop count of dependencies required to locate the particular CI system, wherein the hop count identifies a quantity of multiple devices that must be traversed in order to reach a CI that is stored in the particular CI system, and wherein the multiple devices comprise a Linux server, a database server, and a switch.

2. The method of claim 1, further comprising:
receiving, by one or more processors, a request for a cross CI report, wherein the cross CI report identifies all CIs that describe a predefined descriptor of the particular CI system; and
generating, by one or more processors, the cross CI report.

3. The method of claim 1, further comprising:
filtering, by the ticketing system, CIs based on a type of computer system represented by the CIs; and
directing, by one or more processors, the request to the particular CI system based on filtered CIs.

4. The method of claim 1, further comprising:
displaying, by one or more processors, Universal Identifiers (UIDs) for a plurality of CI systems; and receiving, by one or more processors, a selected UID for the particular CI system in which the authorized change is to be made.

5. The method of claim 4, wherein the request is received from a change owner, and wherein the method further comprises:
in response to the change owner being unable to determine which CI to choose as the particular CI system, querying, by a parser system, the plurality of CI systems for attribute information, wherein the parser system is a hardware system;
populating, by one or more processors, the CMDB stub database with the attribute information for the plurality of CI systems.

6. The method of claim 1, further comprising:
in response to a variance being found, transmitting, by one or more processors, a communication to the ticketing system to automatically generate an Incident, wherein the Incident identifies the variance that is found.

7. The method of claim 1, wherein the ticketing system runs the CI variance scan.

8. The method of claim 1, wherein a managing server runs the CI variance scan, wherein the managing server manages changes to the CI systems.

9. The method of claim 1, wherein the particular CI system runs the CI variance scan locally.

10. A computer program product for locally managing configuration item (CI) on CI systems, the computer program product comprising a non-transitory computer readable storage medium having program code embodied therewith, the program code readable and executable by a processor to perform a method comprising:
receiving a request for authorized CI information, wherein authorized CI information describes an authorized change to be made to a particular CI system;
in response to receiving the request for the authorized CI information, searching, by a ticketing system, a Configuration Management Database (CMDB) stub database for a location of a CI to be changed according to the authorized change to the particular CI system, wherein the CI is a document that provides a description of the particular CI system, wherein the CMDB stub database contains no CIs, wherein the CMDB stub database contains a location of CI systems in which CIs are locally stored, and wherein the CI systems in which the CIs are locally stored are configured according to the CIs that are stored within the CI systems;
receiving a request for a cross CI report, wherein the cross CI report identifies all CIs that describe a predefined descriptor of the particular CI system;
generating the cross CI report;
initiating the authorized change to the particular CI system requested by the request;
updating the CI in the particular CI system to reflect the authorized change to the particular CI system;
parsing the request into multiple sub-requests, wherein each of the multiple sub-requests is a query for a description of a same component found in each of multiple CI systems;
determining whether an answer to one or more of the multiple sub-requests is stored in a cache in the CMDB stub database;
in response to determining that the answer to the one or more of the multiple sub-requests is not stored in the cache, associating each of the multiple CI systems with a particular CI;
transmitting each of the multiple sub-requests to the particular CI in a corresponding CI system from the multiple CI systems;
receiving responses to all of the multiple sub-requests;
generating a final report based on the responses to all of the multiple sub-systems, wherein the final report comprises a description of a size of memory in each of the multiple CI systems;
running a CI variance scan, wherein the CI variance scan scans CIs in the CI systems to determine if any variances to the CIs have occurred since a last CI variance scan; and
running a CI dependency scan, wherein the CI dependency scan determines a hop count of dependencies required to locate the particular CI system, wherein the hop count identifies a quantity of multiple devices that must be traversed in order to reach a CI that is stored in the particular CI system, and wherein the multiple devices comprise a Linux server, a database server, and a switch.

11. The computer program product of claim 10, wherein the method further comprises:
filtering, by the ticketing system, CIs based on a type of computer system represented by the CIs; and
directing the request to the particular CI system based on filtered CIs.

12. The computer program product of claim 10, wherein the method further comprises:
displaying Universal Identifiers (UIDs) for a plurality of CI systems; and
receiving a selected UID for the particular CI system in which the authorized change is to be made.

13. A system for locally managing configuration item (CI) on CI systems, the system comprising:
a CI system, wherein the CI system is a hardware resource that locally stores a CI that describes resources within the CI system, wherein the CI is a document that provides a description of the CI system, and wherein the CI system;
runs a CI variance scan, wherein the CI variance scan scans CIs in the CI systems to determine if any variances to the CIs have occurred since a last CI variance scan; and
runs a CI dependency scan, wherein the CI dependency scan determines a hop count of dependencies required to locate the particular CI system, wherein the hop count identifies a quantity of multiple devices that must be traversed in order to reach a CI that is stored in the particular CI system, and wherein the multiple devices comprise a Linux server, a database server, and a switch;
a ticketing system, wherein the ticketing system is a hardware system that receives a request for authorized CI information, wherein authorized CI information describes an authorized change to be made to the CI system;
a Configuration Management Database (CMDB) stub database server, wherein the CMDB stub database server contains a CMDB stub database, wherein the CMDB stub database contains a location of CI systems in which CIs are locally stored, and wherein the CMDB stub database server, in response to the ticketing system receiving the request for the authorized CI information, provides a location of a CI to be changed according to the authorized change to the CI system; and a managing server, wherein the managing server:
  supervises updates to CIs in the CI systems;
  generates a cross CI report, wherein the cross CI report identifies all CIs that describe a predefined descriptor of the CI system;
  initiates the authorized change to the CI system requested by the request; and updates the CI in the CI system to reflect the authorized change to the CI system; and a parser system, wherein the parser system:
  parses the request into multiple sub-requests, wherein each of the multiple sub-requests is a query for a description of a same component found in each of multiple CI systems;
  determines whether an answer to one or more of the multiple sub-requests is stored in a cache in the CMDB stub database;
  in response to determining that the answer to the one or more of the multiple sub-requests is not stored in the cache, associates each of the multiple CI systems with a particular CI;
  transmits each of the multiple sub-requests to the particular CI in a corresponding CI system from the multiple CI systems;
  receives responses to all of the multiple sub-requests; and
  generates a final report based on the responses to all of the multiple sub-systems, wherein the final report comprises a description of a size of memory in each of the multiple CI systems.

14. The system of claim 13, wherein the ticketing system:
  filters CIs based on a type of computer system represented by the CIs; and
  directs the request to the CI based on filtered CIs.

* * * * *